United States Patent [19]

Braat et al.

[11] Patent Number: 5,071,237
[45] Date of Patent: Dec. 10, 1991

[54] ZOOM LENS FOR AN ELECTRONIC CAMERA

[75] Inventors: Josephus J. M. Braat; Albert Smid, both of Eindhoven, Netherlands

[73] Assignee: U.S. Philips Corp., New York, N.Y.

[21] Appl. No.: 497,747

[22] Filed: Mar. 19, 1990

Related U.S. Application Data

[63] Continuation of Ser. No. 293,558, Jan. 3, 1989, abandoned, which is a continuation of Ser. No. 57,191, Jun. 3, 1987, abandoned.

[30] Foreign Application Priority Data

Jan. 13, 1987 [NL] Netherlands .......................... 8700059

[51] Int. Cl.$^5$ .......................... G02B 15/00; G02B 9/64; G02B 13/22
[52] U.S. Cl. ..................................... 359/686; 359/663
[58] Field of Search ........................ 350/423, 415, 427

[56] References Cited

U.S. PATENT DOCUMENTS

| | | |
|---|---|---|
| 3,891,304 | 6/1975 | Muszumanski . |
| 4,518,228 | 5/1985 | Sugiura ................ 350/415 |
| 4,763,998 | 8/1988 | Tsuji et al. ............ 350/427 |

Primary Examiner—Bruce Y. Arnold
Assistant Examiner—Rebecca D. Gass
Attorney, Agent, or Firm—William L. Botjer

[57] ABSTRACT

A zoom lens is described for an electronic camera for still pictures, comprising a front group ($G_1$), a variator group ($G_2$) and a main group ($G_4$). The lens is designed in such a manner that the sum of the spherical aberrations of the front group and the variator group is constant throughout the zoom range and is adapted to that of the main group.

6 Claims, 5 Drawing Sheets

ZOOM LENS FOR AN ELECTRONIC CAMERA

This is a continuation of application Ser. No. 293,558 filed Jan. 3, 1989 which is a continuation of application Ser. No. 057,191 filed June 3, 1987, now abandoned.

BACKGROUND OF THE INVENTION

The invention relates to a zoom lens for an electronic camera with which still pictures can be picked up, which zoom lens, viewed from the object end, successively comprises a positive first lens group, a second negative lens group which is movable with respect to the first lens group, a third lens group and a stationary and positive fourth lens group, the fourth lens group being the main group which has a constant power and the first three lens groups combined constituting a lens system of small power and variable magnification.

A zoom lens of this type is known per se. U.S. Pat. No. 3,891,304 describes a zoom lens of the said composition for use in an 8-mm film camera. For a number of reasons the known zoom lens is not suitable for an electronic still picture camera.

In such a camera a photosensitive film is no longer used for recording the picked-up pictures, but these pictures are electronically recorded in order at a later stage to be reproduced via an electronic display device, such as a television picture display device, or printed. In this camera a so-called electronic image sensor is located in the image plane of the zoom lens, which sensor not only comprises a bidimensional matrix of radiation-sensitive semiconductor elements, but also electronic circuits coupled to these elements for processing and temporarily storing the picture information which is present in the electrical output signals of the radiation-sensitive elements. The image sensor has a radiation-sensitive surface whose dimensions differ from those of the image plane of a conventional photocamera or those of a conventional film camera. A commonly used electronic image sensor, for example in the form of a so-called charge-coupled device or CCD which is formed as a frame transfer device or FTD such as are used in video cameras has an image field diagonal of 11 mm. A zoom lens having a corresponding image field diagonal will have to be used when using such an image sensor in a camera for still pictures.

As compared with a zoom lens for a motion-picture camera, the lens for a still-picture camera should not only have a higher resolving power but it should also be free from distortion to a greater extent. Distortion is to be understood to mean the distortion of the image, for example the so-called barrel or pin-cushion distortion. The human eye can sooner detect a distortion or a poor resolving power in a still picture than in a moving picture.

As is known, an electronic colour image sensor comprises three types of radiation-sensitive elements each being only sensitive to the primary colours red, green and blue, respectively. These elements are juxtaposed in a regular pattern, with the elements of a first type always being surrounded by elements of the two other types. Since the radiation-sensitive elements have a given thickness, a beam portion having the size of a radiation-sensitive element may not only pass through a desired radiation-sensitive element but also through an adjacent element of another colour in the case of oblique incidence of the chief ray of an imaging beam. This might result in a colour shift in the reconstructed picture. It is therefore desirable for the zoom lens to be telecentric at the image end. In fact, the chief ray of a beam imaging a point of the object in a point of the sensor is then always perpendicularly incident on the sensor surface.

SUMMARY OF THE INVENTION

It is an object of the present invention to provide a class of zoom lenses which is specially suitable for use in an electronic camera for still pictures and thus meets the above-mentioned requirements.

To this end the zoom lens according to the invention is characterized in that the curvatures of the surfaces of the lens elements in the first and second lens groups as well as the positions of the second lens group associated with given focal lengths are such that the sum of the spherical aberration of the first lens group and that of the second lens group is constant throughout the zoom range.

The zoom range is to be understood to mean the range of focal lengths at which the lens can be adjusted.

The spherical aberration referred to in this context is the mutual spherical aberration of the chief rays of the sub-beams entering the zoom lens at different angles. This spherical aberration may also be referred to as the spherical aberration of the image of the entrance pupil, hence the image of the pupil in the object space formed by the the lens groups located in front of this pupil. The said condition implies that the chief rays of all sub-beams pass through one and the same point of the pupil.

It is essential for the zoom lens according to the invention that the distortion of the lens portion comprising the first three lens groups is constant throughout the zoom range from the telepositiion to the wide-angle position. Consequently the lens may have a telecentric design. It is true that the zoom lenses hitherto known have a very small distortion in the teleposition, but the distortion of these zoom lenses is considerable in the wide-angle position.

A further advantage of the zoom lens according to the invention, as compared with that described in U.S. Pat. No. 3,891,304, is that the maximum field angle, in the wide-angle position, for which the lens is still sufficiently free from distortion may be larger, for example $2 \times 30°$ for the novel zoom lens and approximately $2 \times 20°$ for the known zoom lens. The field angle is to be understood to mean the angle at which in the object space the chief ray of an obliquely incident beam which is passed by the zoom lens with an acceptable vignetting crosses the optical axis of the lens.

The zoom lens according to the invention is preferably further characterized in that in the telemode the rays of the most oblique marginal beam which enters at the angle of acceptance extend at relatively small angles to the normals on the lens elements of both the first and the second lens group, whilst these rays in the second lens group extend close to the optical axis, and the spherical aberrations of the first and second lens groups are small and compensate each other at least for the greater part, in the wide-angle mode the rays of the said marginal beam extend at relatively large angles to the normals on the lens elements of both the first and the second lens group, whilst these rays in the second lens group extend at a relatively large distance from the optical axis, and the relatively large positive spherical aberration of the first lens group and the relatively large negative spherical aberration of the second lens group compensate each other to the same extent as in the telemode.

A marginal beam is a beam from the edge of the object. The angle of acceptance is the angle at which the chief ray of the most oblique marginal beam which passes through the zoom lens with an acceptable vignetting crosses the axis of the zoom lens. The angle of acceptance is thus equal to the maximum field angle.

The remaining spherical aberration of the first two lens groups combined may in principle be equal to zero. Then the main group must also be completely corrected for spherical aberration.

However, the zoom lens according to the invention is preferably further characterized in that the constant spherical aberration of the first and second lens groups combined is equal and opposite to that of the main group.

In that case no extra steps have to be taken to render the main group on the one hand and the combination of the first and second lens groups on the other hand free from aberration.

Likewise as in the zoom lens described in U.S. Pat. No. 3,891,304, the third lens group may be movable and then serves as a focus compensator during zooming. In addition to this focus compensator the known zoom lens has a positive stationary lens group between the focus compensation and the main group.

In order to limit the axial and transversal chromatic aberration of the zoom lens, the zoom lens is further characterized in that a lens element of both the first, the second and the fourth lens group is in the form of a doublet.

A doublet is a composite lens element comprising two lens elements having different dispersions which are cemented together directly or via a layer of air and in which the internal surfaces of these lens elements have the same curvature.

BRIEF DESCRIPTION OF THE DRAWING

The invention will now be described by way of example with reference to the accompanying drawings in which.

DESCRIPTION OF THE PREFERRED EMBODIMENTS

Figure 1A:
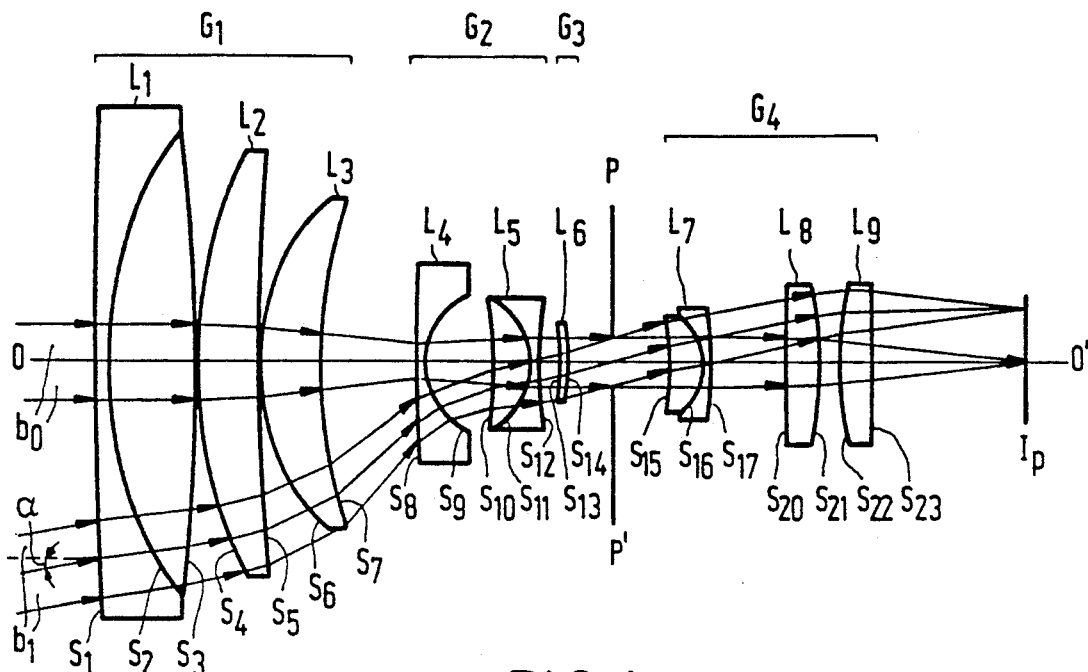
FIGS. 1a, 1b and 1c, FIGS. 2a, 2b and 2c and FIGS. 3a, 3b and 3c show a first, a second and a third embodiment, respectively of the zoom lens, namely in the teleposition, the normal position and the wide-angle position, respectively. Corresponding elements in the Figures have the same reference numerals.
Figure 1B:
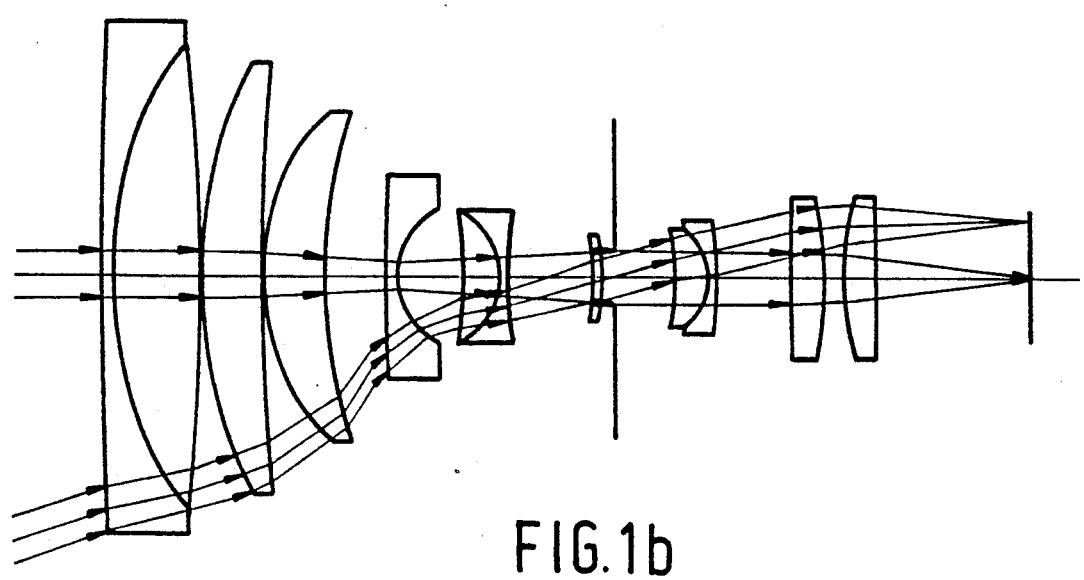
Figure 1C:
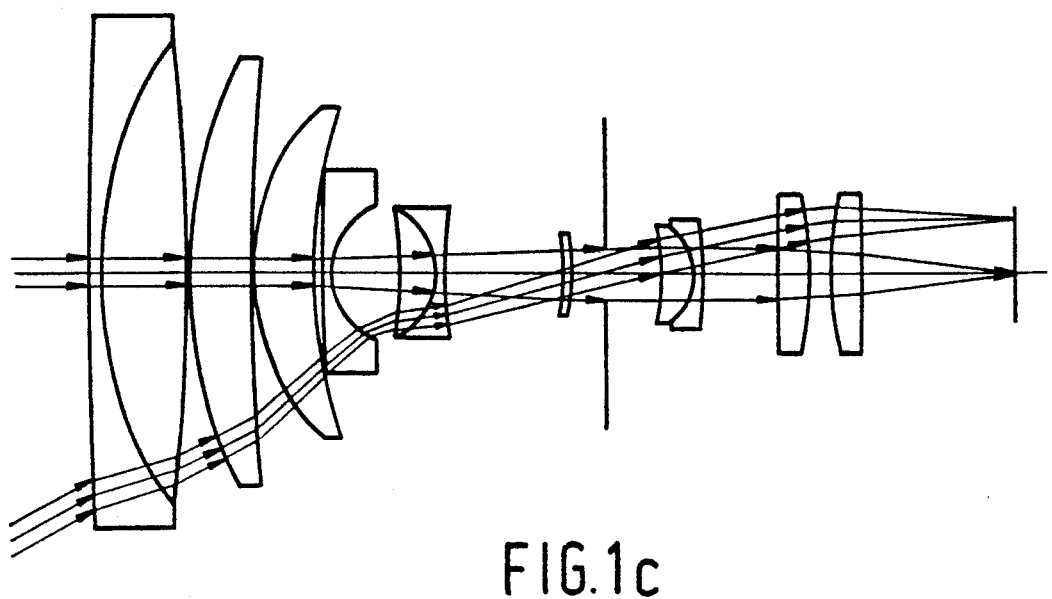
Figure 2A:
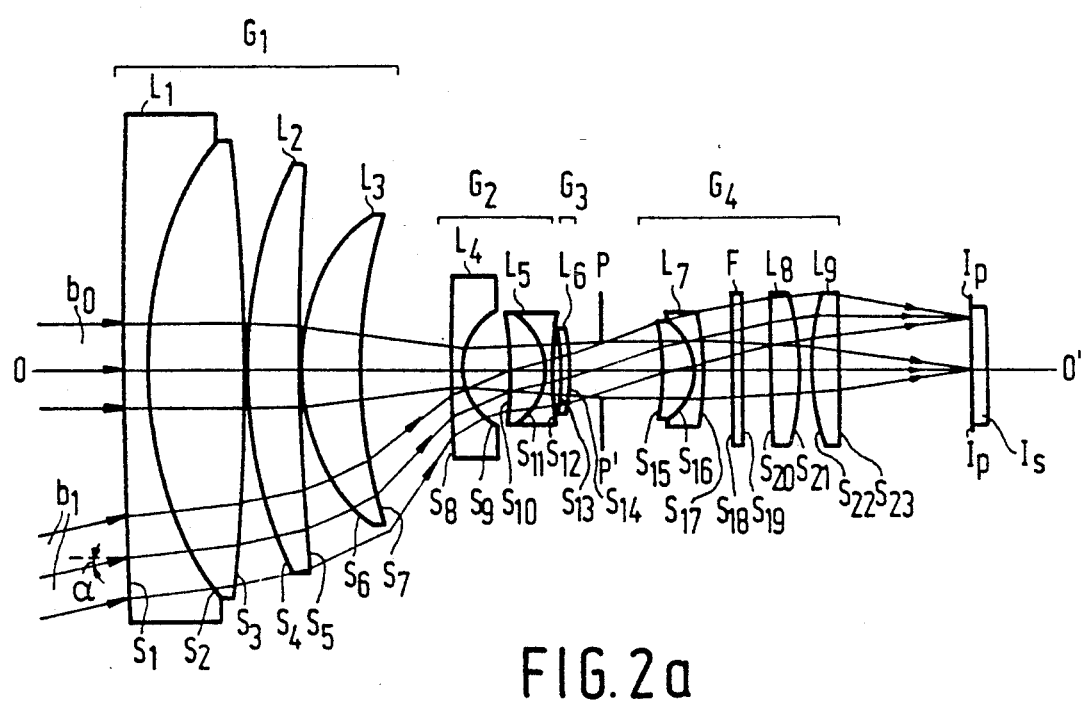
Figure 2B:
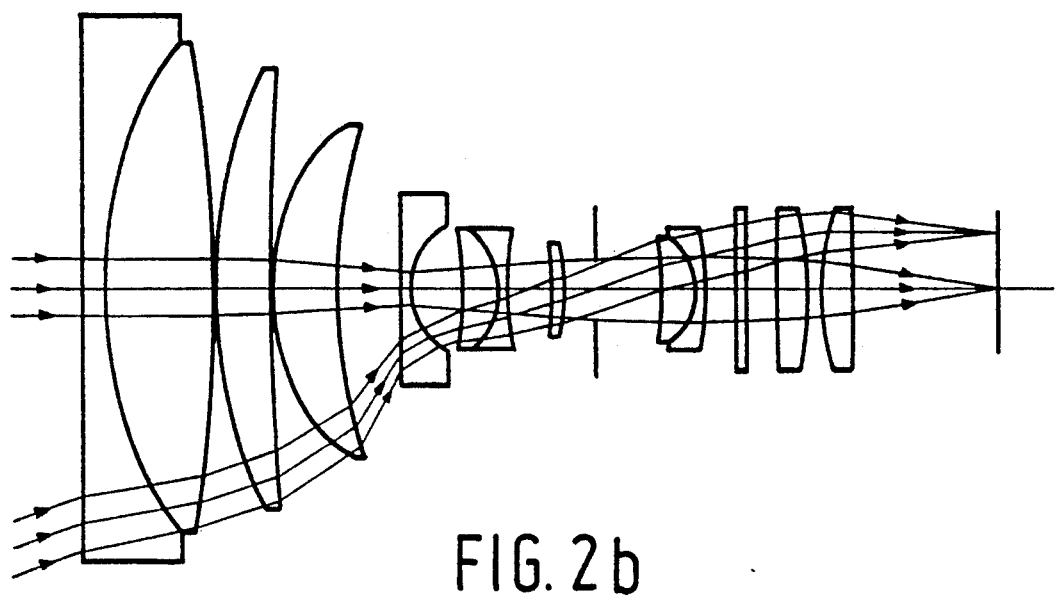
Figure 2C:
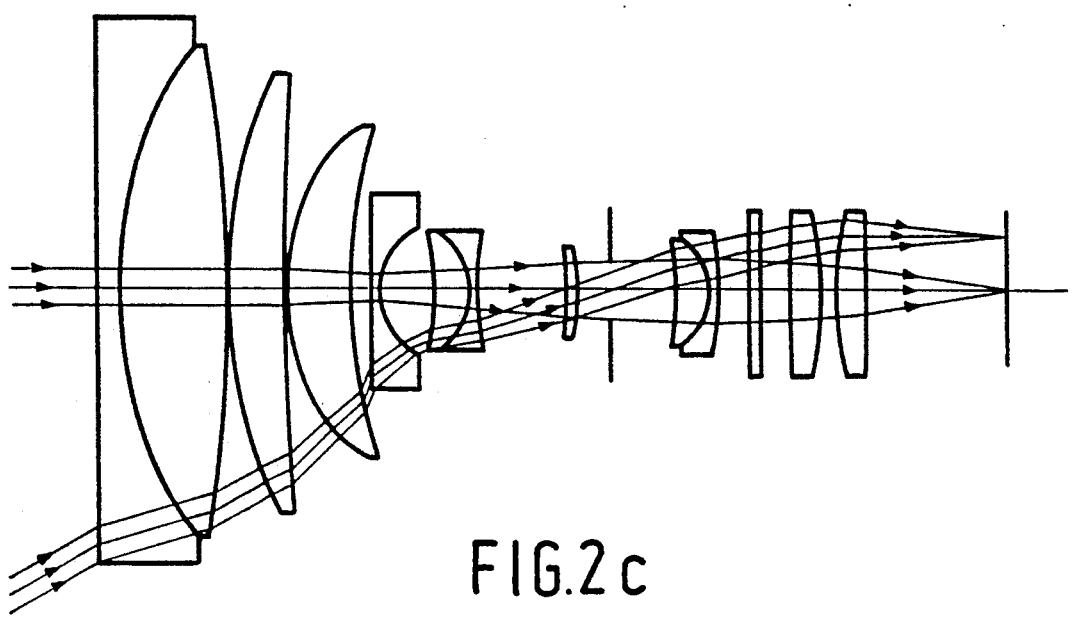
Figure 3A:
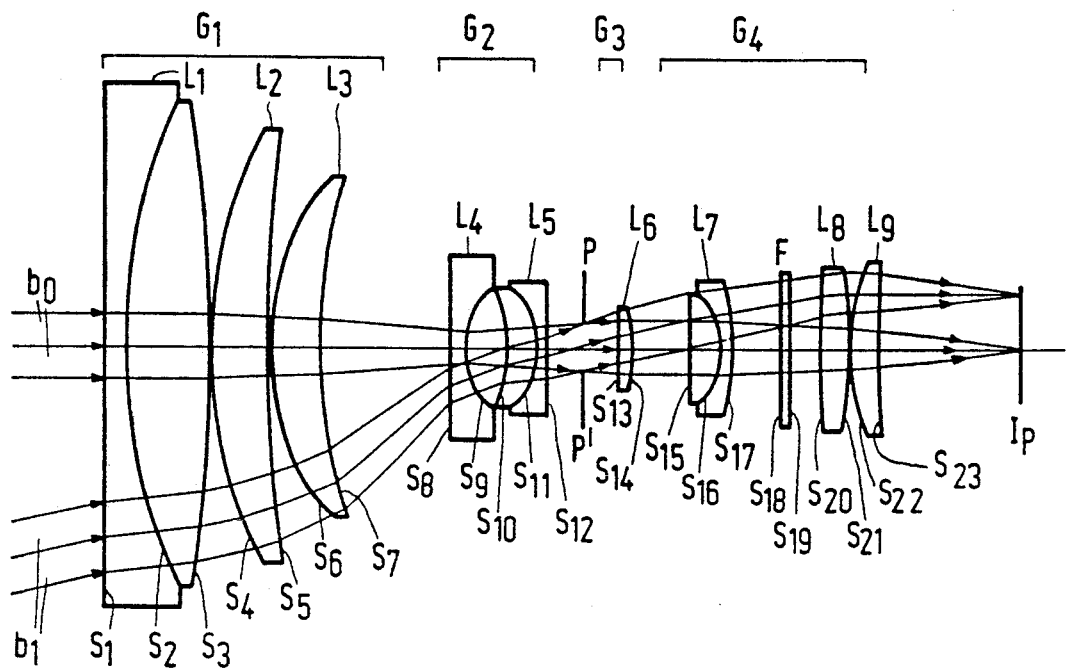
Figure 3B:
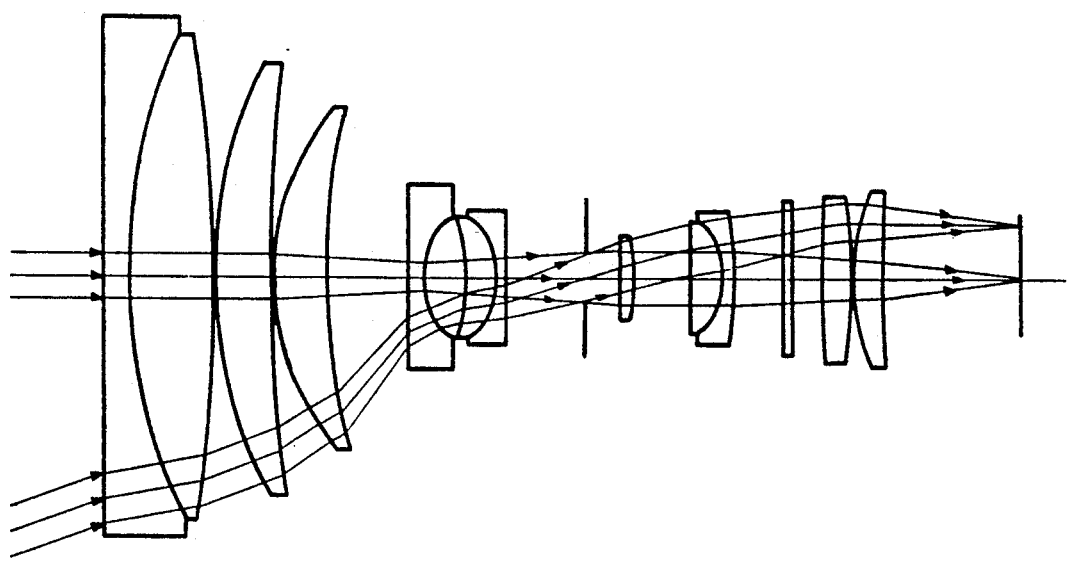
Figure 3C:
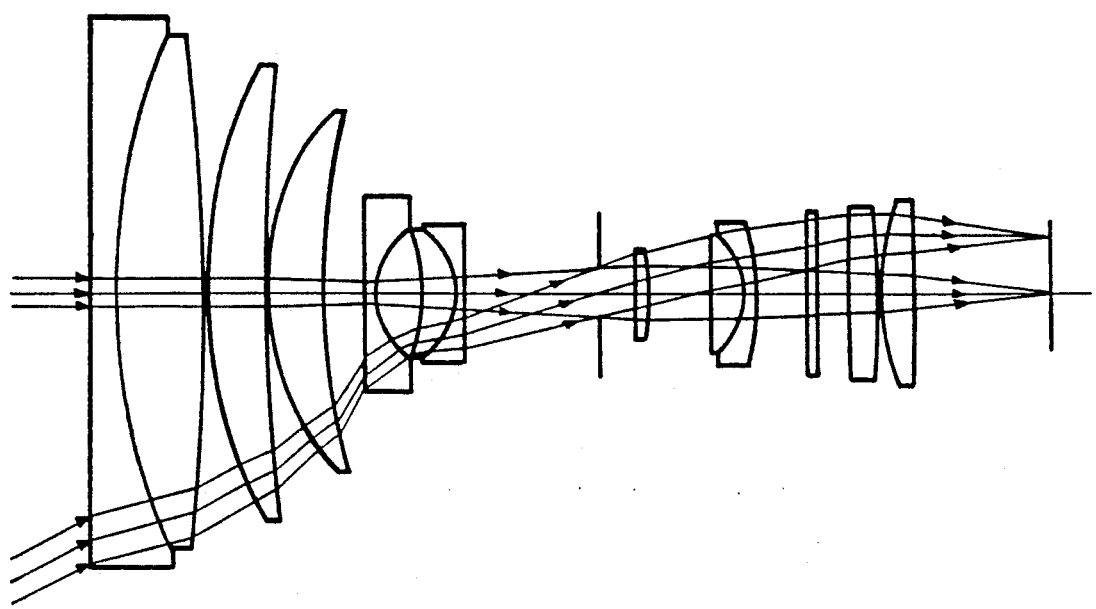

Viewed from the object end, which is on the lefthand side of the drawing, the zoom lens comprises a positive first lens group $G_1$, also referred to as front group, consisting of three positive lens elements $L_1$, $L_2$ and $L_3$. This group is followed by a movable and negative group $G_2$ consisting of two negative lens elements $L_4$ and $L_5$. The focal length can be adjusted by moving this group, which is also referred to as the variator group. In FIGS. 1b, 2b and 3b the variator group is in the intermediate position and the zoom lens has the average or "normal" focal length. FIGS. 1a, 2a and 3a show the teleposition in which the variator group is placed in the extreme right position and the focal length of the zoom lens is maximum. The wide-angle position of the zoom lens is shown in FIGS. 1c, 2c and 3c. The variator group is then in the extreme left position and the focal length is minimum.

A, for example positive, lens group $G_3$ which may consist of a single lens element $L_6$ is arranged behind the variator group. If this lens element is positive, it converts a diverging beam emanating from the variator group into a parallel beam. The lens group $G_3$ may also be divergent to a small extent.

A beam emanating from the lens group $G_3$ is focussed in the image plane IP by a fourth lens group $G_4$ which supplies approximately the total power of the zoom lens in the intermediate zoom position and which is referred to as the main group. The main group may comprise three positive lens elements $L_7$, $L_8$ and $L_9$.

The pupil PP' of the zoom lens is in the proximity of the first lens element $L_7$ of the main group so that the two first lens groups are used rather eccentrically, that is to say, the marginal beams pass through these lens groups at a relatively large distance from the optical axis 00'.

The zoom lens according to the invention is satisfactorily corrected for distortion throughout the zoom range. This can be illustrated by tracing the chief ray of the most oblique beam $b_1$ through the zoom lens in the two extreme situations: the teleposition and the wide-angle position.

In the teleposition (FIGS. 1a, 2a and 3a) the angle of incidence $\alpha$ of the chief ray of the beam $b_1$ is relatively small, for example 10°. The elements of the front group are traversed maximally eccentrically. The lens elements $L_1$, $L_2$ and $L_3$ of this group are curved in such a manner that the maximum condition of deviation is substantially complied with per lens element, that is to say, per lens element in the front group the angle at which the chief ray is bent upon passage through this lens element is small. The positive spherical aberration of the chief ray of the marginal beam $b_1$ in the front group is relatively small with respect to the chief ray of the central beam $b_0$. The lens elements $L_4$ and $L_5$ of the variator group $G_2$ are traversed relatively close to the optical axis in the teleposition and the negative spherical aberration of this lens group is relatively small. It may be ensured that the sum of the small positive and the small negative spherical aberrations compensates the spherical aberration of the main group. In the case of an ideal main group, without spherical aberration, the said sum must also be zero.

In the wide-angle position the angle of incidence $\alpha$ of the chief ray of the beam $b_1$ is considerably larger, for example 30° than in the teleposition. The variator group $G_2$ is now located close to the front group and the rays of the beam $b_1$ traverse the elements of the variator group at a relatively large distance from the optical axis. Consequently, a relatively large negative spherical aberration which in itself might cause a large so-called pin-cushion distortion in the image plane IP occurs in this group. This is, however, avoided in that due to the large angle of incidence the chief ray of the beam $b_1$ no longer traverses the lens elements of the front group $G_1$ in accordance with the minimum condition of deviation, so that the beam $b_1$ has a relatively large positive spherical aberration in the front group. This aberration compensates the relatively large negative spherical aberration of the variator group at least for the greater part, so that the resultant aberration is equal to that in the teleposition.

Thus it can be achieved that the net spherical aberration of the beam passing through the zoom lens is substantially equal in the teleposition and in the wide-angle position after it has traversed the telescopic lens portion comprising the lens groups $G_1$, $G_2$ and $G_3$. In the zoom lens according to the invention the distortion may be kept smaller than approximately 1% in all zoom ranges.

Preferably a lens element in both in the front group $G_1$, the variator group $G_2$ and in the main group $G_4$ is in the form of a doublet. In the embodiments shown in the Figures these are the elements $L_1$, $L_5$ and $L_7$. Due to this step the chromatic aberrations can be limited; for example, the transverse colour error may be smaller than approximately 5 microns whilst the longitudinal colour error may be smaller than the depth of field of the zoom lens. Due to the different dispersions of the sub-elements of the said doublets, these elements have a chromatising effect.

In the embodiment shown in FIGS. 1a, 1b and 1c the lens group $G_3$ is movable. By automatically adapting the position of this group to that of the variator group $G_2$ it can be ensured that the diverging beam emanating from the variator group is converted into a parallel beam. Then each sub-beam emanating from the lens portion $G_1$, $G_2$ and $G_3$ is each time focussed in the image plane IP by the main group $G_4$. The movable lens group $G_3$ is then a focus compensator.

In the embodiment shown in FIGS. 2a, 2b and 2c the lens group $G_3$ is stationary. This group can then no longer function as a focus compensator during zooming. In order to achieve that nevertheless a sharp picture is each time formed on the image sensor IS, during zooming of the beam passing through the zoom lens focussing can be detected via the image sensor or a separate focus detection device in the camera of which the zoom lens forms part. The focussing can be re-adjusted with the focus error signal obtained, for example by moving the front group $G_1$.

The object distance can also be adjusted by axial movement of the front group.

An infrared filter F is arranged between the lens element $L_7$ and the lens element $L_8$ in the zoom lens shown in FIGS. 2a, 2b and 2c.

For a zoom lens according to FIGS. 2a, 2b and 2c whose focal length is adjustable between 10 mm and 26 mm and whose F number is equal to F/2.8, the following values apply to the distances d between the surfaces $S_1 \ldots S_{23}$, the axial curvatures C, the refractive indices n and the diameters D of the surfaces:

|  |  | d (mm) | C | n | D (mm) |
|---|---|---|---|---|---|
|  | $S_1$ |  | 0.000000 |  | 53.0 |
| $L_1$ |  | 2.5000 |  | 1.7918 |  |
|  | $S_2$ |  | 0.023375 |  | 48.0 |
|  |  | 10.5000 |  | 1.6629 |  |
|  | $S_3$ |  | −0.006916 |  | 48.0 |
|  |  | 0.2000 |  | 1.0000 |  |
|  | $S_4$ |  | 0.020235 |  | 43.0 |
| $L_2$ |  | 5.6000 |  | 1.6229 |  |
|  | $S_5$ |  | 0.002722 |  | 43.0 |
|  |  | 0.2000 |  | 1.0000 |  |
|  | $S_6$ |  | 0.048035 |  | 32.4 |
| $L_3$ |  | 6.2000 |  | 1.6940 |  |
|  | $S_7$ |  | 0.017590 |  | 32.4 |
|  |  | $d_1$ |  | 1.0000 |  |
|  | $S_8$ |  | 0.002597 |  | 19.0 |
| $L_4$ |  | 1.0000 |  | 1.6940 |  |
|  | $S_9$ |  | 0.146508 |  | 12.2 |
|  |  | 5.2000 |  | 1.0000 |  |
|  | $S_{10}$ |  | −0.031813 |  | 11.8 |
|  |  | 3.5000 |  | 1.7918 |  |
| $L_5$ | $S_{11}$ |  | −0.132204 |  | 11.8 |
|  |  | 1.0000 |  | 1.6229 |  |
|  | $S_{12}$ |  | 0.019499 |  | 11.8 |
|  |  | $d_2$ |  | 1.0000 |  |

-continued

|  |  | d (mm) | C | n | D (mm) |
|---|---|---|---|---|---|
|  | $S_{13}$ |  | −0.025002 |  | 9.0 |
| $L_6$ |  | 1.2000 |  | 1.6229 |  |
|  |  |  | −0.065947 |  | 9.0 |
|  | $S_{14}$ |  |  |  |  |
|  |  | 9.4102 |  | 1.0000 |  |
|  | $S_{15}$ |  | −0.020507 |  | 10.2 |
|  |  | 3.5000 |  | 1.7923 |  |
| $L_7$ | $S_{16}$ |  | −0.170711 |  | 10.2 |
|  |  | 1.000 |  | 1.7918 |  |
|  | $S_{17}$ |  | −0.047777 |  | 12.0 |
|  |  | 2.8052 |  | 1.0000 |  |
|  | $S_{18}$ |  | 0.000000 |  | 16.0 |
| F |  | 1.0000 |  | 1.5187 |  |
|  | $S_{19}$ |  | 0.000000 |  | 16.0 |
|  |  | 3.0000 |  | 1.0000 |  |
|  | $S_{20}$ |  | 0.006476 |  | 16.0 |
| $L_8$ |  | 3.0000 |  | 1.6229 |  |
|  | $S_{21}$ |  | −0.025250 |  | 16.0 |
|  |  | 1.3156 |  | 1.0000 |  |
|  | $S_{22}$ |  | 0.043493 |  | 16.0 |
| $L_9$ |  | 3.0000 |  | 1.6229 |  |
|  | $S_{23}$ |  | 0.000000 |  | 16.0 |

The pupil PP' is at, for example 3 mm from the lens $L_6$. This distance can be varied. The distances denoted by $d_1$ and $d_2$ in the Table above are variable. The following values for $d_1$ and $d_2$ apply to the different zoom distances $d_Z$:

| $d_Z$ | $d_1$ (mm) | $d_2$ (mm) |
|---|---|---|
| f = 26 mm | 9.5360 | 0.6692 |
| f = 16 mm | 5.9749 | 4.2229 |
| f = 10 mm | 1.7391 | 8.4575 |

The overall length of this zoom lens is approximately 89.5 mm.

The zoom lens shown in FIGS. 3a, 3b and 3c is different from that shown in FIGS. 2a, 2b and 2c in that the lens elements $L_4$ and $L_5$ are placed closer together and in that the lens element $L_6$ is arranged behind the pupil PP'.

For a zoom lens as shown in FIGS. 3a, 3b and 3c whose focal length is adjustable between 10.5 mm and 25 mm and whose F number can be adjusted between F/4.0 and F/2.8, the following values apply to the distances d between the surfaces $S_1 \ldots S_{23}$, the axial curvatures C, the refractive indices n and the diameters D of the surfaces:

|  |  | d (mm) | C | n | D (mm) |
|---|---|---|---|---|---|
|  | $S_1$ |  | 0.000064 |  | 52.8 |
|  |  | 2.5000 |  | 1.7918 |  |
| $L_1$ | $S_2$ |  | 0.016701 |  | 49.0 |
|  |  | 8.4000 |  | 1.6629 |  |
|  | $S_3$ |  | −0.005420 |  | 49.0 |
|  |  | 0.2000 |  | 1.0000 |  |
|  | $S_4$ |  | 0.021750 |  | 44.0 |
| $L_2$ |  | 5.9000 |  | 1.6229 |  |
|  | $S_5$ |  | 0.004915 |  | 44.0 |
|  |  | 0.2000 |  | 1.0000 |  |
|  | $S_6$ |  | 0.036099 |  | 35.0 |
| $L_3$ |  | 5.1000 |  | 1.6940 |  |
|  | $S_7$ |  | 0.014637 |  | 35.0 |
|  |  | $d_1$ |  | 1.0000 |  |
|  | $S_8$ |  | 0.000000 |  | 19.0 |
| $L_4$ |  | 1.2000 |  | 1.6940 |  |
|  | $S_9$ |  | 0.128381 |  | 12.7 |
|  |  | 4.3000 |  | 1.0000 |  |
|  | $S_{10}$ |  | −0.043571 |  | 12.6 |
|  |  | 3.1000 |  | 1.7918 |  |
|  | $S_{11}$ |  | −0.115245 |  | 12.6 |

-continued

|     |        | d (mm) | C | n | D (mm) |
|-----|--------|--------|-----------|--------|------|
|     |        | 1.0000 |           | 1.6229 |      |
|     | $S_{12}$ |      | −0.007312 |        | 13.5 |
|     |        | $d_2$  |           | 1.0000 |      |
|     | PP'    |        | 0.000000  |        | 4.4  |
|     |        | 3.5000 |           | 1.0000 |      |
|     | $S_{13}$ |      | −0.008706 |        | 9.0  |
| $L_6$ |      | 1.4000 |           | 1.6229 |      |
|     | $S_{14}$ |      | −0.055360 |        | 9.0  |
|     |        | 5.7716 |           | 1.0000 |      |
|     | $S_{15}$ |      | −0.007096 |        | 11.7 |
|     |        | 3.3000 |           | 1.7923 |      |
| $L_7$ | $S_{16}$ |    | −0.131079 |        | 11.7 |
|     |        | 1.0000 |           | 1.7918 |      |
|     | $S_{17}$ |      | −0.031244 |        | 14.0 |
|     |        | 4.8592 |           | 1.0000 |      |
|     | $S_{18}$ |      | 0.000000  |        | 16.0 |
| F   |        | 1.0000 |           | 1.5187 |      |
|     | $S_{19}$ |      | 0.000000  |        | 16.0 |
|     |        | 3.000  |           | 1.0000 |      |
|     | $S_{20}$ |      | 0.009431  |        | 17.0 |
| $L_8$ |      | 3.0000 |           | 1.6229 |      |
|     | $S_{21}$ |      | −0.017628 |        | 17.0 |
|     |        | 0.2000 |           | 1.0000 |      |
|     | $S_{22}$ |      | 0.039210  |        | 18.0 |
| $L_9$ |      | 3.0000 |           | 1.6229 |      |
|     | $S_{23}$ |      | 0.007229  |        | 18.0 |

The following values for $d_1$ and $d_2$ apply to the different zoom distances $d_Z$:

| $d_Z$       | $d_1$ (mm) | $d_2$ (mm) |
|-------------|------------|------------|
| f = 25 mm   | 13.0499    | 3.7591     |
| f = 16 mm   | 8.5994     | 8.1989     |
| f = 10.7 mm | 3.8037     | 12.9857    |

What is claimed is:

1. A zoom lens for an electronic still camera which, viewed from the object end, successively comprises a positive first lens group, a second negative lens group movable with respect to said first lens group, a third lens group and a stationary and positive fourth lens group, said fourth lens group being the main lens group which has a constant power and the first three lens groups combined constituting a lens system of small power and variable magnification, wherein the curvatures of the surfaces of the lens elements in said first and second lens groups as well as the positions of said second lens group associated with given focal lengths are such that the sum of the spherical aberration of said first lens group and that of said second lens group is a constant, including zero, throughout the zoom range and equal and opposite to that of said main lens group.

2. A zoom lens as claimed in claim 1, characterized in that
in the telemode the rays of the most oblique marginal beam which enters at the angle of acceptance extend at relatively small angles to the normals on the lens elements of both said first and said second lens groups, whilst these rays in said second lens group extend close to the optical axis, and the spherical aberrations of said first and second lens groups are small and compensate each other at least for the greater part, and in that
in the wide-angle mode the rays of said marginal beam extend at relatively large angles to the normals on the lens elements of both said first and said second lens groups, whilst these rays in said second lens group extend at a relatively large distance from said optical axis, and the relatively large positive spherical aberration of said first lens group and the relatively large negative spherical aberration of said second lens group compensate each other to the same extent as in the telemode.

3. A zoom lens as claimed in claim 1 or 2, characterized in that a lens element of the first, the second and the fourth lens group is a doublet.

4. A zoom lens for an electronic still camera, which viewed from the object end, successively comprises a positive first lens group, a second negative lens group movable with respect to the first lens group, a third lens group and a stationary and positive fourth lens group, said fourth lens group being the main lens group which has a constant power and the first three lens groups combined constituting a lens system of small power and variable magnification, wherein the curvatures of the surfaces of the lens elements in said first and second lens groups as well as the positions of said second lens group associated with given focal lengths are such that the sum of the spherical aberration of said first lens group and that of said second lens group is a constant, including zero, through-out the zoom range.

5. A zoom lens as claimed in claim 4, wherein:
in the telemode the rays of the most oblique marginal beam which enters at the angle of acceptance extend at relatively small angles to the normals on the lens elements of both the first and second lens group, while these rays in the second lens group extend close to the optical axis, and the spherical aberrations of the first and second lens groups are small and compensate each other at least for the greater part, and in that
in the wide-angle mode of the rays of the said marginal beam extend at relatively large angles to the normals on the lens elements of both the first and the second lens group, while these rays in the second lens group extend at a relatively large distance from the optical axis, and the relatively large positive spherical aberration of the first lens group and the relatively large negative spherical aberration of the second lens group compensate each other to the same extent as in the telemode.

6. A zoom lens as claimed in claim 4 wherein a lens element of the first, second and fourth lens group is a doublet.

* * * * *